United States Patent

[11] 3,619,722

| [72] | Inventors | Melvin C. Gill;<br>William M. Dartt, both of Jackson, Mich. |
|---|---|---|
| [21] | Appl. No. | 34,412 |
| [22] | Filed | May 4, 1970 |
| [45] | Patented | Nov. 9, 1971 |
| [73] | Assignee | Acme Industries, Inc.<br>Jackson, Mich. |

[54] REFRIGERATION PROTECTIVE SYSTEM
11 Claims, 2 Drawing Figs.

[52] U.S. Cl. .................................................. 317/13 R,
62/161, 317/36 TD, 317/40 R, 318/471, 318/484
[51] Int. Cl. ........................................................ H02h 7/08
[50] Field of Search .......................................... 317/13 R,
13 A, 40 R, 36 TD; 307/118; 318/471, 484;
62/161

[56] References Cited
UNITED STATES PATENTS

| 3,101,432 | 8/1963 | Adams | 317/13 |
| 3,170,304 | 2/1965 | Hale | 62/161 X |
| 3,417,305 | 12/1968 | Russell | 317/13 X |
| 3,434,028 | 3/1969 | McCready | 318/484 |

Primary Examiner—James D. Trammell
Attorney—Beaman & Beaman

ABSTRACT: A protective control system for a refrigeration circuit incorporating a current-sensitive, manually resettable switch employed in conjunction with a time delay switch and a resistor wherein the current-sensitive switch is adapted to be selectively connected to the resistor, and tripped open thereby, in the event a malfunction occurs in the compressor motor starter means, or an abnormal condition exists at the compressor motor, as sensed by a protective motor switch. The use of the time delay switch prevents short cycling of the refrigeration circuit and upon the current-sensitive switch being connected in series across the load for a predetermined time interval with the resistor, the current-sensitive switch will open to protect the circuit, requiring manually resetting, and provide an opportunity for inspection of the apparatus prior to restarting of the compressor motor.

PATENTED NOV 9 1971

3,619,722

INVENTORS
MELVIN C. GILL
WILLIAM M. DARTT

BY Beaman & Beaman

ATTORNEYS

REFRIGERATION PROTECTIVE SYSTEM

BACKGROUND OF THE INVENTION

The invention pertains to protective control circuits for refrigeration systems which eliminate short or rapid cycling, and requires manual reset in the event a compressor motor protective switch opens or if a motor starter relay or contactor malfunctions and fails to properly close when energized.

A number of control circuits for refrigeration systems exist which require manual resetting. Also, the use of time delay switches in refrigeration circuits is known in order to control short cycling. However, the complexity of present refrigeration circuits, such as those found in commercial air-conditioning systems, presents the possibility of a wide variety of possible malfunctioning, and many of the safety controls presently available, and used with refrigeration circuits, automatically reset, which, though convenient, may cause damage to the equipment in the event the cause of the malfunctioning has not been remedied before the circuit is reset.

While it is known to use time delay switches in refrigeration circuits, such time delay switches are normally employed in the starting sequence of the refrigeration compressor motor or motors, and are ineffective to protect the apparatus once the compressor motor starters or contactors have been energized. Malfunctioning at the starter motor controllers or contactors can cause reduced voltages to be supplied to the starter motor, resulting in damage to the motor. This type of possible damage is particularly likely to occur in refrigeration circuits using a plurality of compressor motor controllers to start a single motor.

It is desired to provide a refrigeration protection circuit capable of rendering the circuit inactive in the event of malfunctioning wherein considerable versatility in the operation of the circuit is possible, yet the cost of the components must be reasonable, and the circuit must be simple enough to minimize the likelihood of malfunctioning due to control circuit component failures. Many of the present control circuits lack the versatility desired, and are often more complex and expensive than necessary.

SUMMARY OF THE INVENTION

It is the purpose of the invention to provide a refrigeration protective system for refrigeration circuits employing a compressor motor or motors which, in addition to providing the usual protective measures, also includes (a) protection against rapid or short cycling of the compressor motor, (b) the positive deenergizing of the circuit, and the requiring of manual resetting, if the compressor motor exceeds a safe operating temperature, or if other compressor motor protective means indicate an abnormal condition at the motor, even though such means are automatically resetting, and (c) deenergizing of the control circuit and compressor motor if a malfunctioning at a motor controller or starter occurs, particularly where two or more controllers are used with a single compressor motor, the circuit deenergizing the compressor motor if a controller fails to properly close during initial starting, or opens prematurely, even though control power is available to the controllers.

In the practice of the invention, the refrigeration control circuit includes a compressor motor starter controller or relay, and usually includes at least two such controllers with a single compressor motor. Operation of the compressor motor is determined by the demand for cooling as sensed by a thermally operated switch, such as that sensing the water temperature of an air-conditioning system chiller, or sensing the temperature of air within the enclosure to be controlled. Intermediate the thermally operated switch and the motor starters a current-sensitive switch is located in series with the temperature-operated switch and interposed between a time delay switch which produces a predetermined time interval before energization of the motor starters after closing of the thermally operated switch when requiring a demand for cooling. A resistor, having a resistance capable of overloading the current-sensitive switch when connected in series therewith, is included in the circuit and is connected in series with the current-sensitive switch when the control circuit is in the inactive position wherein cooling is not required. Additionally, a control relay capable of disconnecting the resistor from the current-sensitive switch is included in the circuit, and is in series with a compressor motor protective device whereby, if the motor protective device is closed to establish a circuit to the control relay, energization of the circuit by means of the thermally operated switch disconnects the current-sensitive switch from the resistor and permits the operation of the motor controllers to be under the control of the time delay switch.

Should the motor protective device be open, for instance, due to an excessive motor temperature, closing of the thermally operated switch fails to energize the control relay, maintaining the series connection of the current-sensitive switch with the resistor causing the current-sensitive switch to be overloaded and trip open. As the current-sensitive switch must be manually reset, the circuit cannot be energized without personal attention by an operator.

In the practice of the invention, the compressor motor controller or relay includes normally closed auxiliary contacts which open upon the controller being properly energized. Should the controller fail to open, or close once the compressor motor operation has begun, the auxiliary contacts close to connect a resistor in series with the current-sensitive switch causing an overload condition which trips the current-sensitive switch open and deenergizes the entire control circuit.

As presently mentioned, it is common practice to use a pair of motor controllers or relays in the control of a single compressor motor, and the aforementioned utilization of auxiliary contacts with each controller connected in parallel with each other, causes the current-sensitive switch to be overloaded by the resistor in the event only one of the motor controllers malfunctions. Thus, the possible damage that may occur to a compressor motor only partially energized through one controller is minimized.

The control relay also includes contacts constituting a holding circuit for maintaining the control relay energized after the time delay switch has shifted to energize the motor starters. Additionally, the control relay includes contacts interposed between the time delay switch and the motor controllers which prevents the motor controllers from being energized regardless of the position of the time delay switch in the event the motor protective circuit should open, and eliminates the possibility of the motor controllers being energized when the control relay is deenergized.

An object of the invention is to minimize the complexity of the circuit by using a single resistor of the central tap type to protect both protective phases of the circuit in which the current-sensitive switch is connected in series with a resistance, and by the use of the central tap resistor a variation in the time required to trip the current-sensitive switch is obtained, and is variably adjustable.

BRIEF DESCRIPTION OF THE DRAWINGS

The aforementioned objects of the invention and relationships of the components will be apparent from the following description and accompanying drawings wherein.

DESCRIPTION OF THE PREFERRED EMBODIMENT

The circuit illustrated in the figures is a control circuit normally operating on 110 volts AC, and the supply power conductors are indicated at 10 and 12. The control circuit illustrated may be used with most types of refrigeration apparatus employing compressor motors and operated by a thermally responsive switch or equivalent device. For instance, air-conditioning equipment employing water chillers may be protected by the invention, as well as other types of refrigeration circuits.

In the disclosed embodiment the temperature operated and sensing switch 14 is illustrated which, in a water chiller environment, would constitute a water temperature sensing switch. The switch 14 is connected to the supply conductor 10, and the current-sensitive switch 16 is connected in series with the switch 14 and is preferably located between safety controls 18 and thermally operated switch 14.

The current-sensitive switch 16 is of the manually resettable circuit breaker type adapted to remain closed, until tripped open by an electrical current passing therethrough of a value greater than its designed capacity. In a commercial embodiment of the invention the current-sensitive switch has a 1 ampere rating, and this switch is so located on a control panel, not shown, as to be readily accessible by the operator.

The disclosed circuit illustrates the presence of safety controls 18, not specifically identified, but may be of the usual type employed in refrigeration circuits. For instance, such safety controls may include high and low refrigerant pressure cutout switches, lubricating pressure sensing devices, and the like which deenergize the control circuit upon the occurrence of a related abnormal condition.

Figure 1:
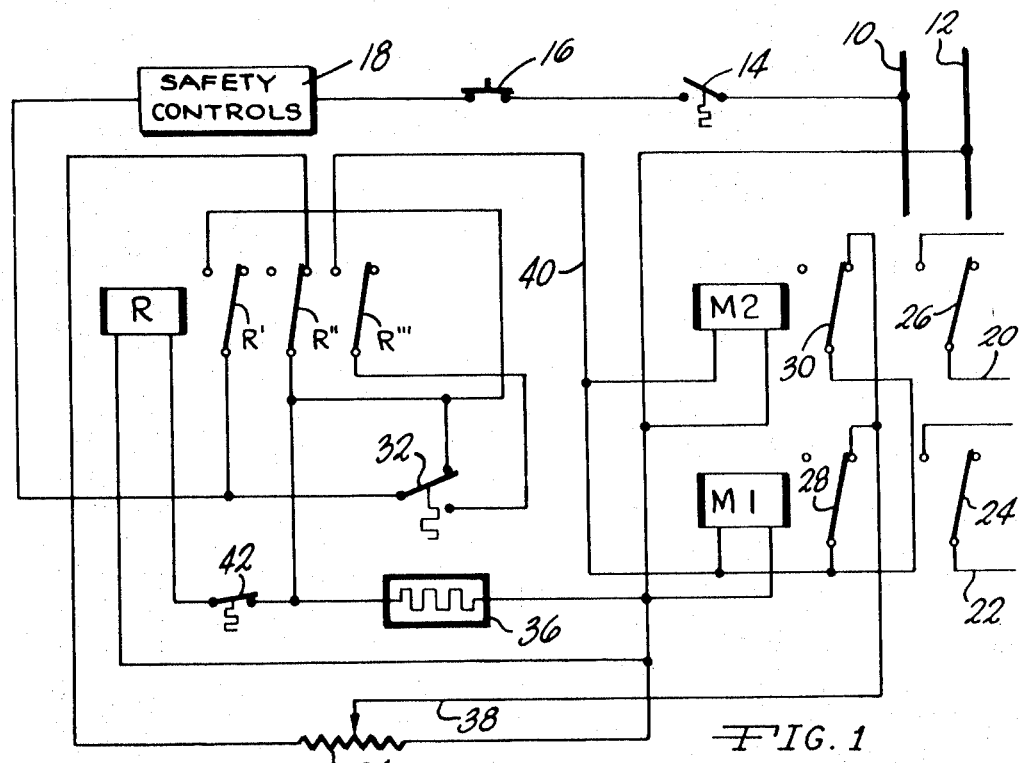
FIG. 1 is a view of the refrigeration protective systems circuit in accord with the invention illustrating the "off" or normal deenergized condition.

The compressor motor, not shown, controlled by the refrigeration control system disclosed, is supplied by conductors 20 and 22 which would normally be of a higher voltage than that supplied through conductors 10 and 12. As is common in refrigeration circuits, two motor starters or controllers are illustrated which constitute relays M1 and M2 adapted to shift the high-voltage compressor motor switches 24 and 26, respectively, to a closed condition upon energization of the relays. The relays M1 and M2 also include auxiliary switch contacts 28 and 30 which are normally closed, as illustrated in FIG. 1, and shift to open positions, FIG. 2, when the associated relay coil is energized to close the compressor motor switches 24 and 26.

The circuit includes a control relay consisting of a coil R and switches R', R" and R"'. Additionally, the circuit includes a time delay switch 32 movable between the "off" position of FIG. 1 which interconnects the current-sensitive switch 16, through R" to a resistor 34 connected to the power supply conductor 12. The time delay switch 32 illustrated is of the bimetal type and employs a heater resistance 36 for producing the heat to cause the switch to shift from the position of FIG. 1 to that of FIG. 2 after a predetermined interval. The disclosed time delay switch is of the single-pole double-throw type and may be of the type manufactured by Texas Instrument Company, Model 59000C-1. Such a switch closes in 30 to 50 seconds after being off for 6 minutes, and will open in 30 to 90 seconds after the heater has been deenergized.

The resistor 34 is of the central tap type and includes a central tap 38 connected to the auxiliary contact switches of the motor starter contactor relays M1 and M2 as will be appreciated from the drawing. The auxiliary contact switches 28 and 30 are connected in parallel with each other with respect to the resistance tap 38 and the conductor 40 connected to a terminal of R"'.

The compressor motor protective device consists of a switch 42 which may be a compressor motor thermostat of the automatic resetting type. This type of switch is commonly built into electric motors and is normally closed, and capable of opening upon an overheating occurring within the compressor motor. As will be noted, switch 42 is in series with control relay coil R.

The thermally operated switch 14 and the current-sensitive switch 16 are connected in series with the switch R' and the time delay switch 32. The switch R' is normally open while the time delay switch 32 will normally provide a circuit to the heater 36, and to protective switch 42 and control relay coil R, the latter components being in series. The relay switch R" is in the normally closed condition with respect to the resistor 34, and the control relay switch '" is normally open to prevent the establishment of a circuit between the time delay switch and the starter motor relays M1 and M2.

The circuit components are as illustrated in FIG. 1 when there is no requirement for cooling, and the thermally operated switch 14 will be open as illustrated. Upon the requirement for cooling, the switch 14 will close, establishing a circuit through the current-sensitive switch 16 and the time delay switch 32 which will energize the control relay R, FIG. 2, and immediately establish a holding circuit through R' to the control relay, disconnect the resistor 34 from the series connection with the current-sensitive switch 16 by the actuation of the switch R", and ready the circuit between the time delay switch 32 and the motor controller relays M1 and M2 by the closing of the switch R"'. If, after initial closing of the switch 14, and prior to the closing of the time delay switch 32, a water surge, or other temporary disruption in the refrigeration or temperature sensing circuit cause the switch 14 to chatter on momentarily open, these conditions will not be imposed upon the compressor motor. If such conditions are excessive, the resultant deenergization of the circuit, and the cooling of the heater 36 will delay shifting of the time delay switch.

Figure 2:
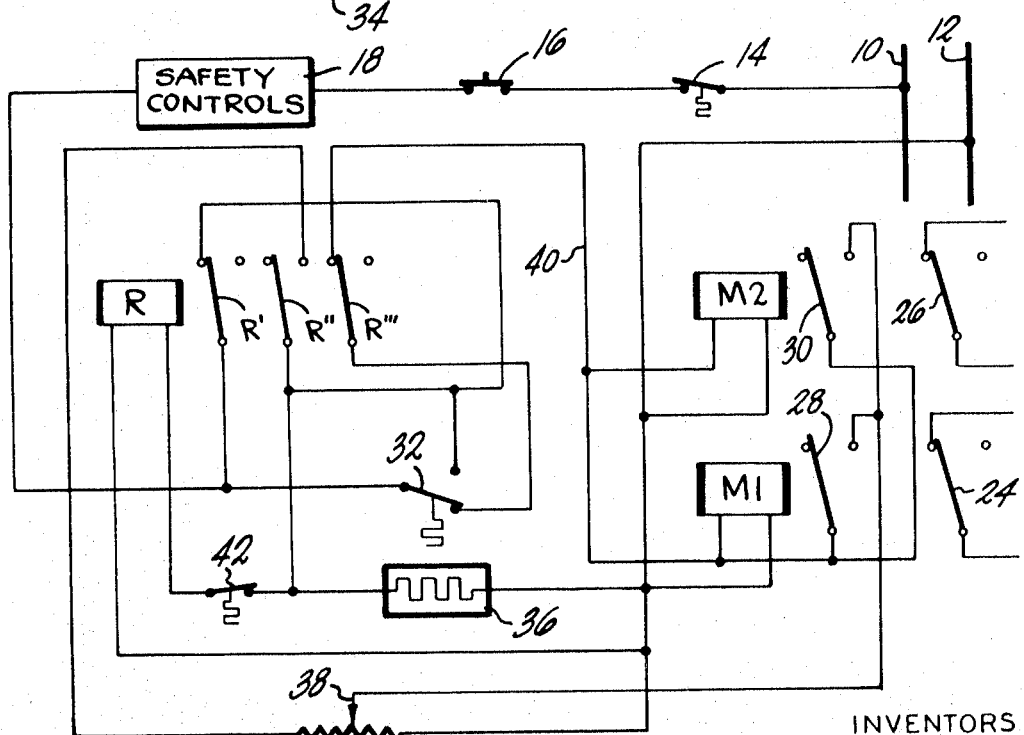
FIG. 2 is a view of the control circuit similar to FIG. 1 illustrating the normal running or operating condition of the circuit.

Assuming that the condition of the refrigeration circuit is normal, upon the designed delay occurring after closing of the temperature-operated switch 14, the time delay switch 32 will shift to the position of FIG. 2 and energize the motor relays M1 and M2 shifting the primary switches 24 and 26 to the illustrated condition and energize the compressor motor, not shown. Simultaneously, the motor contactor auxiliary contacts or switches 28 and 30 will open, FIG. 2. Thereupon, the refrigeration circuit will operate in a normal manner and produce a cooling which will eventually result in the temperature-operated switch 14 opening to deenergize the circuit.

Should the motor protective switch 42 be open and thermal-operated switch 14 close prior to the closing of the compressor motor protective switch, the fact that the switch 42 is open will prevent the control relay R from being energized if the motor is at an unsafe temperature and even if cooling is being called for. The failure of the control relay R to energize upon closing of the switch 14 causes the series connection between the current-sensitive switch 16 and the resistor 34 to remain, as the relay switch R" has not shifted to an open position. The connection of the current-sensitive switch to the resistor causes an overload in the current-sensitive switch tripping the switch 16 open and immediately deenergizing the control circuit. The control circuit cannot be maintained in an energized state until the compressor motor has sufficiently cooled to permit the protective switch 42 to be closed, and as the current-sensitive switch 16 is manually resettable, the operator will be aware of when the apparatus has returned to an operable condition.

As long as the compressor motor protective switch 42 is closed at the time the temperature-operated switch 14 closes, the time delay switch 32 will shift after a predetermined time, from the position of FIG. 1 to the position of FIG. 2. The shifting of the time delay switch to the position of FIG. 2 will energize the conductor 40 supplying the motor starter relays M1 and M2. In normal operation, the energization of the motor controller relays M1 and M2 will cause the switches 24 and 26, and 28 and 30 to shift to the positions of FIG. 2 causing the compressor motor to begin operation. However, in the event that one or both of the relays M1 or M2 should malfunction, and not shift to the energized condition, the auxiliary contact switch 28 or 30 of the malfunctioning starter motor relay will remain closed, as shown in FIG. 1, which causes a flow of current through the resistor central tap 38 producing an overload upon the current-sensitive switch 16 tripping open the switch to deenergize the circuit and indicate to the operator that attention is required.

In the event that the motor relays M1 and M2 initially operate properly, but during operation of the compressor motor one of the relays becomes deenergized or malfunctions to close its auxiliary contact switch, the aforedescribed circuit will be established to produce current flow to the resistor tap 38 and resistor 34 to overload the current-sensitive switch and cause the circuit to turn off the compressor motor. Thus, the use of the auxiliary contact switches permits the circuit to be deenergized in the event either or both of the starter control relays fail to function properly.

It will be appreciated that the time delay switch 32 need not specifically be of the illustrated heater type, but could be of the thermal expansion actuation or dashpot type. Additionally, it will be appreciated that two separate resistors, rather than the central tap resistor 34 could be utilized within the concept of the invention, or the resistor 34 could be of the conventional two terminal type and the auxiliary contact switches be connected thereacross wherein the same resistance value occurs under all conditions. The purpose for using the central tap resistor is to simplify the circuit, yet provide a different resistance value to cause the tripping of the current-sensitive switch to occur sooner if the auxiliary contact switches close, than when the current-sensitive switch is connected in series with the resistor during an initial energizing phase and the protective switch 42 is open. A longer time delay for tripping of the current-sensitive switch is desirable in the latter case and for this reason the two resistance values obtainable with a central tap resistance is of advantage. For purposes of the claims, the resistance 34 may be considered to function as two separate resistors.

It is appreciated that various modifications to the inventive concept may be apparent to those skilled in the art without departing from the scope of the invention.

We claim:

1. A refrigeration protective system for electrical refrigeration control circuits supplied from a power supply including first and second conductors utilizing compressor motor starter means, a compressor motor protective switch movable between open and closed positions and thermally operated switch means selectively connected in series with said starter means across said power supply conductors for selectively energizing the motor starter means upon the demand for cooling, the improvement comprising, in combination, a manually resettable, current-sensitive switch connected in series with said thermally operated switch to said first power supply conductor, a first resistor having first and second terminals, said second terminal being connected to said second power supply conductor, time delay switch means connected in series with said thermally operated switch and said current-sensitive switch having a first position connecting said thermally operated and current-sensitive switches with said starter means and a normal second position connecting said thermally operated and current-sensitive switches to said first terminal of said resistor to place said resistor in series with said current-sensitive switch across said power supply conductors, and control switch means interposed between said time delay switch second position and said resistor first terminal controlled by said protective switch whereby upon closing of said thermally operated switch in demand for cooling said current-sensitive switch is connected to said resistor and will trip open if said protective switch is open to indicate an abnormal condition at said compressor motor, said control switch means disconnecting said resistor from said time delay switch and current-sensitive switch upon said protective switch being closed to indicate a normal condition of the compressor motor.

2. In a refrigeration protective system as in claim 1 wherein said control switch means includes normally open contacts interposed between said time delay switch first position and said motor starter means.

3. In a refrigeration protective system as in claim 2 wherein said control switch means includes normally open holding switch contacts interposed between said thermally operated and current-sensitive switches and said control switch means.

4. In a refrigeration protective system as in claim 1 wherein said motor starting means includes auxiliary normally closed contacts which open upon complete energization of said motor starting means, a second resistor having a second terminal connected to said second supply conductor and a first terminal, said normally closed auxiliary contacts being interposed between said second resistor first terminal and said motor starter means whereby malfunctioning of said starter means closes said auxiliary contacts connecting said second resistor in series with said current-sensitive switch to trip open said current-sensitive switch.

5. In a refrigeration protective system as in claim 4 wherein said first resistor comprises a central tap resistor and said second resistor comprises a portion of said central tap resistor.

6. A refrigeration protective system for electrical refrigeration circuits comprising, in combination, compressor motor starter means having auxiliary normally closed contacts, a thermally operated switch sensing the temperature of the medium being cooled, a manually resettable current-sensitive switch connected in series with said thermally operated switch, power supply means, said switches selectively connecting said motor starter means to said power supply means, a resistor connected in parallel with said motor starter means in series with said auxiliary contacts, said auxiliary contacts being interposed in the circuit between said resistor and said motor starter means whereby closing of said auxiliary contacts upon said switches being closed overloads and opens said current-sensitive switch after a predetermined time interval.

7. In a refrigeration protective system as in claim 6, a compressor motor protective switch movable between open and closed positions indicating normal and malfunctioning conditions of a compressor motor, respectively, a control relay connected in series with said protective switch, a time delay switch connected in series with said thermally operated and current-sensitive switches having a normal position opening the circuit between said switches and said motor starting means and connecting said protective switch and control relay in series with said switches and a timed delay closed position establishing the circuit to said motor starting means, a conductor connecting said resistor to said time delay switch normal position, said control relay including first normally closed contacts interposed in said conductor which open upon energization of said relay, second normally open contacts bypassing said time delay switch and connecting said protective switch to said thermally operated and current-sensitive switches to hold said relay energized and third normally open contacts interposed between said time delay switch and said motor starter means.

8. In a refrigeration protective system as in claim 7 wherein said resistor includes a central tap terminal, said auxiliary contacts being connected to said central tap terminal whereby the resistance value of said resistor through said auxiliary contacts differs with respect to the resistance value of current passing through said control relay first contacts.

9. A refrigeration protective system for electrical refrigeration circuits comprising, in combination, compressor motor starting means, a thermally operated switch and a current-sensitive switch connected in series, a resistor, a time delay switch alternately connecting said switches in series with said motor starting means or said resistor across a power supply, said time delay switch having a normal position connecting said switches to said resistor, a compressor motor protective switch having a normally closed position controlling a control relay, said control relay including contact means disconnecting said switches and said resistor in the normal position of said time delay switch upon said protective switch being in the normally closed, position and upon said switches being closed.

10. In a refrigeration protective system as in claim 9, said motor starting means including normally closed auxiliary contacts, and resistance means connected in parallel with said motor starter means through said auxiliary contacts imposing an overload upon and opening said current-sensing switch upon closing of said auxiliary contacts when said starter means malfunctions.

11. In a refrigeration protective system as in claim 10 wherein said resistor includes a central tap and said resistance means comprises a portion of said resistor.

* * * * *